United States Patent [19]

Moreau et al.

[11] Patent Number: 6,008,275

[45] Date of Patent: Dec. 28, 1999

[54] CEMENTITIOUS MIXTURE CONTAINING HIGH POZZOLAN CEMENT REPLACEMENT AND COMPATABILIZING ADMIXTURES THEREFOR

[75] Inventors: John Moreau, Macedonia; Runhai Lu, Cuyahoga Falls; Jeffrey R. Bury, Macedonia, all of Ohio

[73] Assignee: MBT Holding AG, Zurich, Switzerland

[21] Appl. No.: 09/078,866

[22] Filed: May 14, 1998

Related U.S. Application Data

[60] Provisional application No. 60/046,617, May 15, 1997.

[51] Int. Cl.$^6$ ............................... C08K 3/34; C08K 3/00
[52] U.S. Cl. ................... 524/5; 524/2; 524/4; 106/708; 106/714; 106/718; 106/728; 106/790; 106/810
[58] Field of Search .................. 106/708, 714, 106/718, 728, 790, 810; 524/5, 2, 4

[56] References Cited

U.S. PATENT DOCUMENTS

| | | | |
|---|---|---|---|
| Re. 35,194 | 4/1996 | Gerber | 106/696 |
| 4,088,804 | 5/1978 | Cornwell et al. | 524/5 |
| 4,318,744 | 3/1982 | Dodson | 106/90 |
| 4,337,094 | 6/1982 | Tokar | 106/90 |
| 4,373,956 | 2/1983 | Rosskopf | 106/90 |
| 4,519,842 | 5/1985 | Gerber | 106/90 |
| 4,686,252 | 8/1987 | Bürge et al. | 524/5 |
| 4,725,632 | 2/1988 | Vess | 524/5 |
| 4,741,777 | 5/1988 | Williams et al. | 524/5 |
| 4,741,782 | 5/1988 | Styron | 106/309 |
| 4,752,632 | 6/1988 | Vess | 524/5 |
| 4,761,183 | 8/1988 | Clarke | 106/714 |
| 4,770,708 | 9/1988 | Atkins et al. | 106/98 |
| 4,842,649 | 6/1989 | Heitzmann et al. | 106/89 |
| 4,897,119 | 1/1990 | Clarke | 106/790 |
| 4,946,506 | 8/1990 | Arfaei et al. | 524/5 |
| 5,026,215 | 6/1991 | Clarke | 106/790 |
| 5,032,181 | 7/1991 | Chung | 106/717 |
| 5,076,851 | 12/1991 | Skovara et al. | 106/713 |
| 5,106,423 | 4/1992 | Clarke | 106/790 |
| 5,156,679 | 10/1992 | Gartner et al. | 106/808 |
| 5,158,996 | 10/1992 | Valenti | 524/5 |
| 5,176,753 | 1/1993 | Brook | 106/724 |
| 5,211,751 | 5/1993 | Arfaei et al. | 106/727 |
| 5,306,344 | 4/1994 | Gutmann et al. | 106/714 |
| 5,348,583 | 9/1994 | Arfaei et al. | 106/696 |
| 5,352,288 | 10/1994 | Mallow | 106/605 |
| 5,393,343 | 2/1995 | Darwin et al. | 106/808 |
| 5,536,310 | 7/1996 | Brook et al. | 106/708 |
| 5,556,458 | 9/1996 | Brook et al. | 106/708 |
| 5,565,028 | 10/1996 | Roy et al. | 106/705 |
| 5,603,758 | 2/1997 | Schreifels, Jr. et al. | 106/177 |
| 5,605,571 | 2/1997 | Buerge et al. | 106/808 |

FOREIGN PATENT DOCUMENTS

| | | |
|---|---|---|
| 725044 | 8/1996 | European Pat. Off. . |
| 0 753 488 A2 | 1/1997 | European Pat. Off. . |
| 850894 | 7/1998 | European Pat. Off. . |
| 106447 | 5/1986 | Japan ......................... 524/5 |
| 2195328 | 4/1988 | United Kingdom . |

*Primary Examiner*—Peter A. Szekely
*Attorney, Agent, or Firm*—Renner, Kenner, Greive, Bobak, Taylor & Weber

[57] ABSTRACT

A cementitious mixture comprises a hydraulic cement; greater than about 10% by weight of a pozzolanic cement replacement selected from fly ash, slag, natural pozzolans, and mixtures thereof, based on the weight of said hydraulic cement and cement replacement; and a compatabilizing admixture, wherein the compatabilizing admixture comprises a compatabilizing polycarboxylate polymer dispersant capable of acting as a water reducer, in combination with an accelerator.

70 Claims, No Drawings

CEMENTITIOUS MIXTURE CONTAINING HIGH POZZOLAN CEMENT REPLACEMENT AND COMPATABILIZING ADMIXTURES THEREFOR

CROSS-REFERENCE TO RELATED APPLICATIONS

This application claims the benefit of U.S. Provisional Patent Application No. 60/046,617, filed May 15, 1997.

TECHNICAL FIELD

The present invention is directed to cementitious mixtures containing pozzolanic cement replacement materials. More particularly, the present invention is directed to cementitious mixtures containing high percentages of pozzolan cement replacement, and compatabilizing admixtures therefor.

BACKGROUND OF THE INVENTION

Over the years, the use of cementitious materials as a partial replacement for portland cement in concrete has become an increasingly attractive alternative to portland cement alone. The desire to increase the use of fly ash, blast furnace slag, and natural pozzolanic cement in concrete mixtures can be attributed to several factors. These include cement shortages, economic advantages of portland cement replacement, improvements in permeability of the concrete product, and lower heats of hydration.

The growth in the use of higher amounts of pozzolanic cement replacements, such as fly ash for example, in concrete has been impaired by the potential incompatibility exhibited by these materials, especially when used at high percentages, in combination with water reducing admixtures. Water reducers are desirable to decrease the amount of water required in the preparation of the cementitious mixtures, and to increase the strength of the resulting concrete. However, the incompatibility of the pozzolan replacement materials with water reducing admixtures can result in the significant retardation of the initial and final setting of the concrete containing both these materials.

Despite the cost and performance advantages of fly ash, slag, and natural pozzolans as partial replacements of portland cement in concrete, there are practical limitations to the amount at which they can be used in the cementitious mixture. Using these materials at higher levels, such as above about 10 to 15 weight percent based on the weight of the portland cement, can result in the retarded setting time of the concrete up to several hours, and perhaps longer depending upon the ambient temperature. This incompatibility puts a burden of increased costs and time on the end user which is unacceptable.

While it is known to use set time accelerators in concrete mixtures, these accelerator admixtures have been ineffective in solving the compatibility problem that exists in high pozzolan replacement/portland cement mixtures, particularly when used with water reducing admixtures, so that set time is not able to be decreased to an acceptable level. The use of accelerators with water reducers, such as naphthalene sulfonates, lignin and substituted lignins, melamine and the like, has been ineffective to produce an acceptable high pozzolanic replacement containing hydraulic cement based cementitious mixture with normal setting characteristics and an acceptable resulting concrete.

U.S. Pat. Nos. 4,373,956 and 4,473,405 discloses various admixture compositions for incorporation into hydraulic cement mixes to accelerate the rate of hardening and setting. U.S. Pat. No. 4,337,094 discloses combinations of additives which can be used to accelerate the setting time of portland type cements. These additives, when used in cementitious mixtures containing portland cement and high proportions of pozzolan cement replacements, as well as a water reducer, cannot compensate for the retardation of setting time induced in the mixtures by the cement replacement and water reducer, and thus do not acceptably accelerate the mixture to setting.

U.S. Pat. No. 5,556,458 discloses a cementitious composition containing a high percentage of fly ash and hydraulic cement, but in which a fly ash containing a particular calcium oxide content is required and a water reducing admixture is not present. The composition is useful for quick setting repair mortar type products.

What is required by the industry, however, is a cementitious mixture capable of forming concrete, which contains a significant percentage of cement replacement material (to replace a portion of the hydraulic cement, such as portland cement) for performance and cost considerations, and water reducers to decrease water useage and increase compressive strength, the components in such cementitious mixtures being compatible and which mixtures set in an industry-acceptable time period.

U.S. Pat. No. 5,158,996 and patent publication EP 0753488, both of which are hereby incorporated by reference herein, disclose polymer additives useful as additives, such as dispersants, for cement mixtures, but their use with high pozzolan replacement/portland cement mixtures has not previously been considered.

SUMMARY OF THE INVENTION

It is therefore an object of the invention to provide a cementitious mixture which contains a significant proportion of pozzolan cement replacement materials for hydraulic cement, such as portland cement, as well as water reducing materials, which have acceptable or improved compressive strength.

It is a further object of the invention to provide a cementitious mixture which contains a significant proportion of pozzolan cement replacement materials for hydraulic cement, such as portland cement, as well as water reducing materials, which set in an industry-acceptable time period.

It is a further object of the invention to provide a method for preparing a cementitious material which contains a significant proportion of pozzolan cement replacement materials for hydraulic cement, such as portland cement, as well as water reducing materials, which have acceptable or improved compressive strength and which set in an industry-acceptable time period.

It is a further object of the invention to provide a compatabilizing admixture for cementitious mixtures which contain a significant proportion of pozzolan cement replacement materials for hydraulic cement, such as portland cement, which admixtures provide water reducing means for imparting acceptable or improved compressive strength, and set accelerating means for inducing the mixture to set in an industry-acceptable time period.

The pozzolan cement replacement for a portion of the portland cement, according to the present invention, includes fly ash (both Class C fly ash and Class F fly ash), blast furnace slag, and natural pozzolanic materials. Preferably, up to 50 percent of the portland cement in the cementitious product is replaced by the pozzolanic cement replacement material.

The present invention therefore provides a cementitious mixture comprising a hydraulic cement; greater than about 10% by weight of a pozzolanic cement replacement selected from fly ash, slag, natural pozzolans, and mixtures thereof, based on the weight of said hydraulic cement and cement replacement; and a compatabilizing admixture, wherein the compatabilizing admixture comprises a polycarboxylate water reducing dispersant, in combination with an accelerator for concrete.

In one embodiment, the cementitious mixture of the present invention contains a polycarboxylate dispersant comprising a polymer of general formula I:

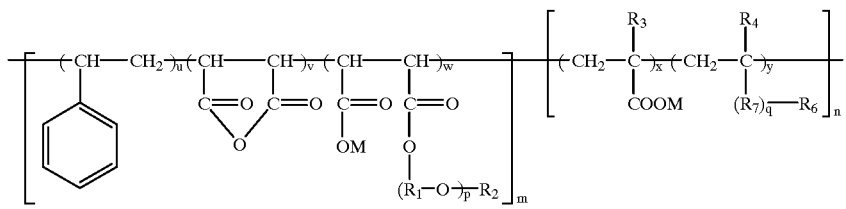

wherein
$R_1$ and $R_5$ are each independently $C_2$–$C_3$ alkyl,
$R_2$, $R_3$, $R_4$, and $R_6$ are each independently H, $C_1$–$C_5$ alkyl, and $R_7$ is one of $O(R_5O)$, $CH_2O(R_5O)$, $COO(R_5O)$, and $CONH(R_5O)$;
M is at least one of H, Li, Na, K, Ca, Mg, $NH_4$, alkylamine and hydroxyalkylamine;
n+m=3 to about 100, preferably n+m=about 5 to about 50,
when m=0, n=about 5 to about 100, preferably n=about 20 to about 50,
when n=0, m=about 3 to about 100, preferably m=about 5 to about 15;
p and q are each independently 1 to about 100, preferably about 15 to about 50;
u, v, and w, are each independently 1 to about 100, preferably 20 to about 50,
with the proviso that when both n>0 and m>0, one of u, v or w may be zero,
when present, the ratio of u to (v+w) is from about 1:10 to about 10:1,
the ratio of u to v is from about 1:1 to about 100:1,
m+p=about 10 to about 400;
x, and y are each independently 1 to about 100, preferably 20 to about 50, with the proviso that when both n>0 and m>0, one of x or y may be zero,
when both are present, the ratio of x to y is about 1:10 to about 10:1,
n+q=about 10 to about 400,
and corresponding acid and alkali metal, alkaline earth metal, or ammonium salt derivatives thereof.

Preferably, the accelerator comprises at least one of a) a nitrate salt of an alkali metal, alkaline earth metal, or aluminum;

b) a nitrite salt of an alkali metal, alkaline earth metal, or aluminum;

c) a thiocyanate of an alkali metal, alkaline earth metal, or aluminum;

d) an alkanolamine;

e) a thiosulfate of an alkali metal, alkaline earth metal, or aluminum;

f) a hydroxide of an alkali metal, alkaline earth metal, or aluminum;

g) a carboxylic acid salt of an alkali metal, alkaline earth metal, or aluminum; or, h) a polyhydroxylalkylamine.

The present invention further provides a method for preparing a cementitious material comprising mixing a hydraulic cement with a pozzolanic cement replacement selected from fly ash, slag, natural pozzolans, and mixtures thereof, and a compatabilizing admixture, wherein the compatabilizing admixture comprises a polycarboxylate water reducing dispersant, in combination with an accelerator for concrete. In one embodiment, the method uses a compatabilizing admixture which comprises a polycarboxylate dispersant comprising a polymer of the general formula I:

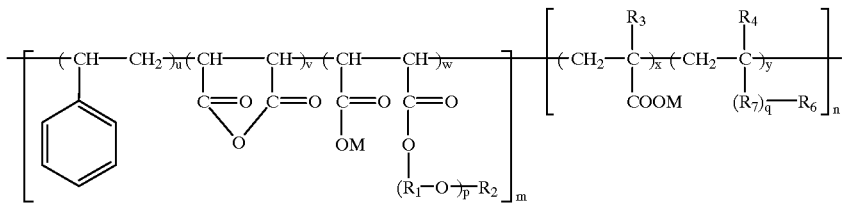

wherein
$R_1$ and $R_5$ are each independently $C_2$–$C_3$ alkyl,
$R_2$, $R_3$, $R_4$, and $R_6$ are each independently H, $C_1$–$C_5$ alkyl, and $R_7$ is one of $O(R_5O)$, $CH_2O(R_5O)$, $COO(R_5O)$, and $CONH(R_5O)$;
M is at least one of H, Li, Na, K, Ca, Mg, $NH_4$, alkylamine and hydroxyalkylamine;
n+m=3 to about 100, preferably n+m=about 5 to about 50,
when m=0, n=about 5 to about 100, preferably n=about 20 to about 50,
when n=0, m=about 3 to about 100, preferably m=about 5 to about 15;
p and q are each independently 1 to about 100, preferably about 15 to about 50;
u, v, and w, are each independently 1 to about 100, preferably 20 to about 50, with the proviso that when both n>0 and m>0, one of u, v or w may be zero,
when present, the ratio of u to (v+w) is from about 1:10 to about 10:1,
the ratio of u to v is from about 1:1 to about 100:1, m+p=about 10 to about 400;
x, and y are each independently 1 to about 100, preferably 20 to about 50, with the proviso that when both n>0 and m>0, one of x or y may be zero,
when both are present, the ratio of x to y is about 1:10 to about 10:1,
n+q=about 10 to about 400,
and corresponding acid and alkali metal, alkaline earth metal, or ammonium salt derivatives thereof; in combination with an accelerator.

The present invention further comprises a compatabilizing admixture for cementitious mixtures containing hydraulic cement and greater than about 10 percent pozzolanic cement replacement based on total weight of the cement and cement replacement, comprising a polycarboxylate water reducing dispersant, in combination with an accelerator for concrete. In one embodiment, the compatabilizing admixture comprises a polycarboxylate dispersant comprising a polymer of the general formula I:

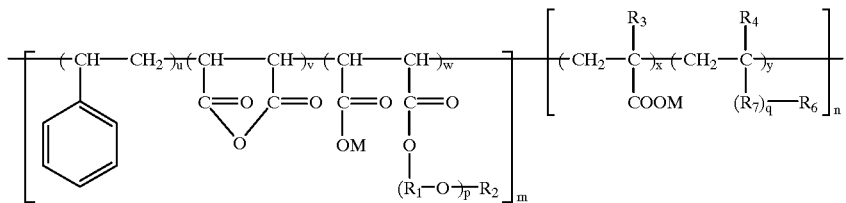

wherein
$R_1$ and $R_5$ are each independently $C_2-C_3$ alkyl,
$R_2$, $R_3$, $R_4$, and $R_6$ are each independently H, $C_1-C_5$ alkyl, and $R_7$ is one of $O(R_5O)$, $CH_2O(R_5O)$, $COO(R_5O)$, and $CONH(R_5O)$;
M is at least one of H, Li, Na, K, Ca, Mg, $NH_4$, alkylamine and hydroxyalkylamine;
n+m=3 to about 100, preferably n+m=about 5 to about 50,
when m=0, n=about 5 to about 100, preferably n=about 20 to about 50,
when n=0, m=about 3 to about 100, preferably m=about 5 to about 15;
p and q are each independently 1 to about 100, preferably about 15 to about 50;
u, v, and w, are each independently 1 to about 100, preferably 20 to about 50,
with the proviso that when both n>0 and m>0, one of u, v or w may be zero,
when present, the ratio of u to (v+w) is from about 1:10 to about 10:1,
the ratio of u to v is from about 1:1 to about 100:1, m+p=about 10 to about 400;
x, and y are each independently 1 to about 100, preferably 20 to about 50, with the proviso that when both n>0 and m>0, one of x or y may be zero,
when both are present, the ratio of x to y is about 1:10 to about 10:1,
n+q=about 10 to about 400,
and corresponding acid and alkali metal, alkaline earth metal or ammonium salt derivatives thereof; in combination with an accelerator, preferably at least one of a) a nitrate salt of an alkali metal, alkaline earth metal, or aluminum;
b) a nitrite salt of an alkali metal, alkaline earth metal, or aluminum;
c) a thiocyanate of an alkali metal, alkaline earth metal, or aluminum;
d) an alkanolamine;
e) a thiosulfate of an alkali metal, alkaline earth metal, or aluminum;
f) a hydroxide of an alkali metal, alkaline earth metal, or aluminum;
g) a carboxylic acid salt of an alkali metal, alkaline earth metal, or aluminum; or,
h) a polyhydroxylalkylamine.

Further objects of the invention, and how the present invention accomplishes these objects, is described in the specification which follows.

DETAILED DESCRIPTION OF THE PREFERRED EMBODIMENTS

The present invention is an additive formulation, or an admixture, for incorporation in hydraulic cement mixtures, such as concretes, mortars and grouts, containing portland cement and pozzolanic cement replacement. By "portland cement" is meant all cementitious compositions which have a high content of tricalcium silicate, and thus are portland cement or are chemically similar or analogous to portland type cement, the specification for which is set forth in ASTM specification C-150-80.

Pozzolanic replacement materials for hydraulic, or portland-type, cement which can be used in high proportion according to the present invention include fly ash, both Class C and Class F, blast furnace slag, and natural pozzolan materials. These replacement materials can be used in a proportion, based on the weight of the hydraulic cement and the cement replacement, of greater than 10 weight percent, preferably greater than 15 weight percent, and most preferably greater than 20 weight percent. It is most preferred, however, that the cementitious mix contain at least 50 weight percent portland cement, based upon the total weight of portland cement and pozzolanic replacement material, combined.

As discussed above, the addition of high proportions of the pozzolanic material to the cementitious mixture in combination with a conventional water reducing admixture (which water reducer increases compressive strength), results in a significant retarding of the setting time for the cementitious mixture.

The present invention provides a novel compatabilizing admixture for the high pozzolanic replacement material containing hydraulic cement, as well as a novel cementitious mixture containing the pozzolanic replacement and the compatabilizing admixture, and a method for preparing the cementitious material. The present invention significantly reduces, and in many instances eliminates the retardation of concrete containing high proportions of pozzolanic replacement materials for the hydraulic, or portland type, cement.

The invention includes a cementitious mixture comprising a hydraulic cement; greater than about 10% by weight of a pozzolanic cement replacement selected from fly ash, slag, natural pozzolans, and mixtures thereof based on the total of said hydraulic cement and cement replacement; and a compatabilizing admixture, wherein the compatabilizing admixture comprises a polycarboxylate water reducing dispersant, in combination with an accelerator for concrete.

The water reducing, polycarboxylate dispersants according to the present invention are generally comprised of polyvinyl carboxylate polymers, derivatized with at least one of carboxyl, sulfonate, and phosphonate functional moeities, and additionally containing non-ionic polymer units comprising, or containing mixtures of, hydrophilic ethylene oxide units, and/or hydrophobic propylene oxide units, as side chains. Representative side chains for the polymers include but are not limited to alkyl, phenyl, substituted phenyl, sulfonated phenyl, carboxylic acid or salt, sulfonic acid or salt, phosphonic acid or salt, polyoxyalkylene, —CH$_2$O-polyoxyalkylene, —C(O)O-polyoxyalkylene, C(O)NH-polyoxyalkylene, —C(O)NH(CH$_2$)$_n$SO$_3$M, and the like.

In one embodiment, the compatabilized admixture includes a polycarboxylate dispersant comprising a polymer of the general formula I:

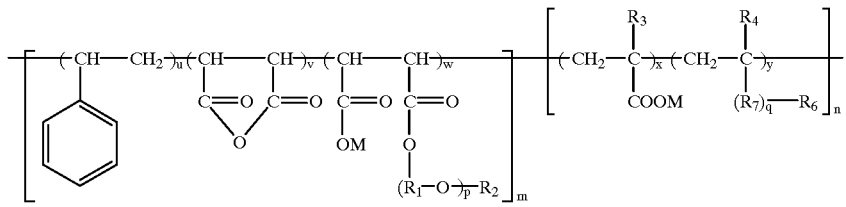

wherein
  $R_1$ and $R_5$ are each independently $C_2$–$C_3$ alkyl,
  $R_2$, $R_3$, $R_4$, and $R_6$ are each independently H, $C_1$–$C_5$ alkyl,
  and $R_7$ is one of O($R_5$O), CH$_2$O($R_5$O), COO($R_5$O), and CONH($R_5$O);
  M is at least one of H, Li, Na, K, Ca, Mg, NH$_4$, alkylamine and hydroxyalkylamine;
  n+m=3 to about 100, preferably n+m=about 5 to about 50,
  when m=0, n=about 5 to about 100, preferably n=about 20 to about 50,
  when n=0, m=about 3 to about 100, preferably m=about 5 to about 15;
  p and q are each independently 1 to about 100, preferably about 15 to about 50;
  u, v, and w, are each independently 1 to about 100, preferably 20 to about 50,
  with the proviso that when both n>0 and m>0, one of u, v or w may be zero,
    when present, the ratio of u to (v+w) is from about 1:10 to about 10:1,
    the ratio of u to v is from about 1:1 to about 100:1,
    m+p=about 10 to about 400;
  x, and y are each independently 1 to about 100, preferably 20 to about 50, with the proviso that when both n>0 and m>0, one of x or y may be zero, when both are present, the ratio of x to y is about 1:10 to about 10:1,
n+q=about 10 to about 400, and corresponding acid and alkali metal, alkaline earth metal, or ammonium salt derivatives thereof; in combination with an accelerator.

By way of example but not limitation, in the general formula I of the polymer useful in the compatabilizing admixture of the present invention, $R_1$ is preferably an ethylene moeity, and most preferably all $R_1$ moeities are the same. $R_2$ is preferably methyl or ethyl, and more preferably is methyl. $R_3$ is preferably a hydrogen atom or methyl, and independently $R_4$ is preferably a hydrogen atom or methyl. $R_5$O may be one species or a mixture of two species of $C_2$ and $C_3$ oxyalkylene groups in block or random form. The polymer of formula I generally has a molecular weight of about 1000 to about 1,000,000, preferably about 2,000 to about 100,000. (Molecular weights herein are number average molecular weights.)

The anhydride group shown in the polymer general formula I may be replaced by the corresponding free carboxylic acid as illustrated by the formula II:

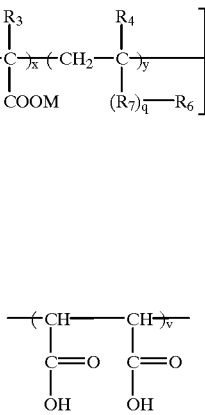

or alkali metal, alkaline earth metal or ammonium salts thereof, preferably Li, Na, K, Ca, Mg, or NH$_4$, most preferably Na, as illustrated by the formula III:

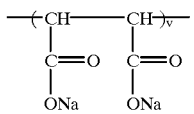

The polymers used in the compatabilizing admixture of the present invention can be made by methods known in the art, such as those referenced in U.S. Pat. No. 5,158,996 and EP 753,488, both of which are hereby incorporated by reference herein.

Monomers (as identified by the associated subscript designation in the general polymer formula I) which can be used to form the polycarboxylate polymer include by way of example but not limitation, styrene as monomer (u); maleic anhydride, maleic acid or salts thereof as monomer (v);

polyalkylene glycol such as those obtained by the addition of alkylene oxides to alkyl or cycloalkylalcohols or phenols as monomer (w); acrylic acid, methacrylic acid or salts thereof as monomer (x); and, as monomer (y), polyethylene glycol mono(meth)acrylate, polypropylene glycol mono (meth)acrylate, polyethylene glycol polypropylene glycol mono(meth)acrylate, methoxy polyethylene glycol mono (meth)acrylate, methoxy polypropylene glycol mono(meth) acrylate, methoxy polyethylene glycol polypropylene glycol mono(meth)acrylate, ethoxy polyethylene glycol mono (meth)acrylate, ethoxy polypropylene glycol mono(meth) acrylate, and ethoxy polyethylene glycol polypropylene glycol mono(meth)acrylate, either singly or in the form of a mixture of two or more.

In one embodiment, a polycarboxylate dispersant useful in combination with an accelerator to form a compatabilizing admixture for a high pozzolanic replacement cementitious mixture according to the present invention comprises a polymer of the general formula IV:

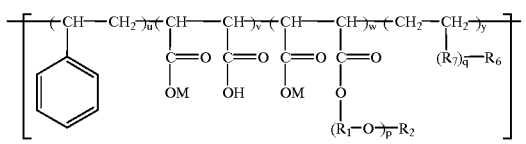

wherein the constituents are as defined in formula I. Preferably, the constituents are defined as follows: $(R_1-O)_p-R_2$ is a polyalkylene glycol chain, $R_5$ is $CH_2CH_2$, $R_6$ is $CH_3$, and $R_7$ is $CH_2O(R_5O)$.

Other polycarboxylate dispersants useful in combination with an accelerator to form a compatabilizing admixture according to the present invention include, but are not limited to, the following.

A methacrylic graft polymer of the general formula V:

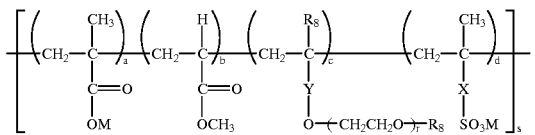

wherein preferably $R_8$ is H or $CH_3$, X is $CH_2$ or $CH_2$-ø, and Y is $CH_2$ or C=O, M is as defined in Formula I, with Na being preferred, a+b+c+d=1, preferably in a ratio of a:b:c:d:=1:1:1:1, r is about 10 to about 1000, and s=2 to about 500, having a molecular weight of about 1000 to about 1,000,000, preferably about 2,000 to about 100,000.

A methacrylic graft polymer of the general formula VI:

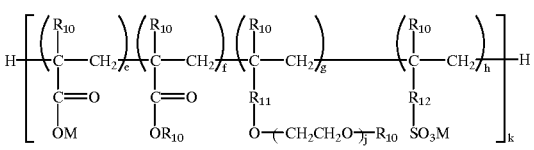

wherein preferably $R_{10}$ is H or $CH_3$, $R_{11}$ is $CH_2$ or C=O, $R_{12}$ is $CH_2$ or $CH_2$-ø, e+f+g+h=1, j is about 10 to about 1000, k=2 to about 500, having a molecular weight of about 1000 to about 1,000,000, preferably about 2,000 to about 100,000.

A methacrylic graft copolymer of the general formula VII:

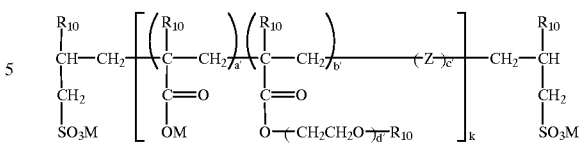

wherein Z is a monomer capable of copolymerizing with the monomers of groups a' and b', such as, for example but not by way of limitation, maleic anhydride, or an ethylenically unsaturated compound such as $CH_2=CHR_{10}-CH_2SO_3M$ or $CH_2=CHR_{10}-CON-CHR_{10}(CH_2OCH_2CH_2)_{d'}-$ $(OCH-CH_2R_{10})-OCH_3$, preferably $R_{10}$ is H or $CH_3$, M is as defined above, a'+b'+c'=1, d' is about 10 to about 10,000, and k=2 to about 500, having a molecular weight of about 1000 to about 1,000,000, preferably about 2,000 to about 100,000.

A methacrylic graft polymer of the general formula VIII

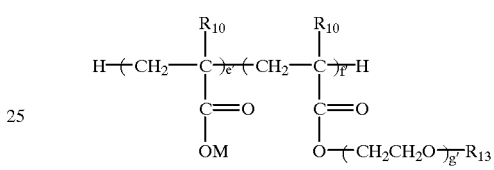

wherein preferably $R_{10}$ is H or $CH_3$, $R_{13}$ is $CH_3$, M is as defined above, e':f' is about 2:1 to about 100:1, and g' is about 10 to about 1000, having a molecular weight of about 1000 to about 1,000,000, preferably about 2,000 to about 100,000.

A succinic anhydride graft copolymer of the general formula IX:

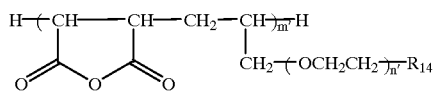

wherein preferably $R_{14}$ is $CH_3$ or t-butylene, m'=1 to about 100, and n'=about 10 to about 1000, having a molecular weight of about 1000 to about 1,000,000, preferably about 2,000 to about 100,000.

While the use of the polycarboxylate polymer dispersants with conventional accelerators, including calcium chloride, is effective to overcome the set time retarding effects of the high pozzolan content cementitious mixture, the present invention is particularly effective in avoiding the use of chloride containing accelerators, and thus avoids corrosion problems often associated with them.

Preferably, the accelerator according to the present invention comprises at least one of
  a) a nitrate salt of an alkali metal, alkaline earth metal, or aluminum;
  b) a nitrite salt of an alkali metal, alkaline earth metal, or aluminum;
  c) a thiocyanate of an alkali metal, alkaline earth metal, or aluminum;
  d) an alkanolamine;
  e) a thiosulfate of an alkali metal, alkaline earth metal, or aluminum;
  f) a hydroxide of an alkali metal, alkaline earth metal, or aluminum;
  g) a carboxylic acid salt of an alkali metal, alkaline earth metal, or aluminum; or, h) a polyhydroxylalkylamine.

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO_2)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula $M(SCN)_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is $NH_c[(CH_2)_dCH_2OH]_e$, where c is 1 to 2, d is 1 to about 5 and e is 1 to about 3. Examples include, but are not limited to, are monoethanoalamine, diethanolamine and triethanolamine.

The thiosulfate salts have the general formula $M_f(S_2O_3)_g$ where M is alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The carboxylic acid salts have the general formula RCOOM wherein R is H or $C_1$ to about $C_{10}$ alkyl, and M is alkali metal or an alkaline earth metal or aluminum. Preferred are carboxylic acid salts of Na, K, Mg, Ca and Al. A preferred carboxylic acid salt is calcium formate.

A preferred polyhydroxylalkylamine has the general formula $(HO)_jNH_k(CH_2)_iNH_k(OH)_j$, wherein j is 1 to 2, k is 1 to about 3, and l is 1 to about 5. Preferred is tetrahydroxyethylenediamine.

A conventional chloride-containing accelerator may be used in combination with the polycarboxylate dispersant to form a compatabilizing admixture according to the present invention, for product applications in which corrosion of reinforcing steel is not an issue, for example, in concrete block production.

The cementitious mixture additionally may contain water in an amount sufficient to effect hydraulic setting of the cement and aggregate mixture, and if desired, an additional material such as silica fume or metakaolin. The term aggregate includes both fine aggregate such as sand and coarse aggregate such as gravel as is common in the art. The proportion of fine and coarse aggregate will vary depending on the desired properties of the mortar or concrete. The amount of water generally should be enough to effect hydraulic setting of the cement component and to provide a desired degree of workability to the mix before hardening.

In the practice of the present invention, the compatabilizing admixture components described above are incorporated into hydraulic cement mixes in amounts sufficient to compatabilize the pozzolanic replacement material and the hydraulic cement, to accelerate the rate of hardening and setting of the mixes and to reduce water to increase compressive strength after hardening, thereby enhancing overall durability of the product. The admixture is preferably incorporated into the mix as an aqueous solution comprising a portion of the water used in mixing the hydraulic cement, pozzolanic replacement material, aggregate, and any additional additives. Representative admixture formulations are set forth in Table 1A, below. (Percentages are by weight.)

TABLE 1A

| Component | Percentage | Preferred |
|---|---|---|
| Nitrate salt | 0–60 | 20–40 |
| Nitrite salt | 0–60 | 20–40 |
| Thiocyanate | 0–10 | 1–4 |
| Alkanolamine | 0–10 | 0–1 |
| Polyhydroxylalkylamine | 0–5 | 0–4 |
| Polymer | 1–20 | 3–8 |
| Thiosulfate | 0–10 | |
| Carboxylic acid salt | 0–20 | |
| Hydroxide | 0–10 | |

The remainder of the admixture solution comprises water. By way of example, but not of limitation, the amount of active admixture material delivered per 100 pounds of cementitious material (cement+cement replacement) in aqueous solution is preferably calculated as follows in Table 1B.

TABLE 1B

| Admixture Solution | | Active Components (pounds) |
|---|---|---|
| (Fl. oz.) | (ml/100 kg) | (% by wt. cementitious material) |
| 2.5 | 160 | 0.09 |
| 5 | 320 | 0.18 |
| 10 | 650 | 0.36 |
| 20 | 1300 | 0.72 |
| 30 | 1960 | 1.08 |
| 40 | 2600 | 1.44 |
| 50 | 3260 | 1.80 |

SPECIFIC EMBODIMENTS OF THE INVENTION

For the purpose of illustrating the advantages obtained by the practice of the present invention, plain concrete mixes were prepared and compared with similar mixes containing the compatabilizing admixture described above. The methods and details of testing were in accordance with current applicable ASTM standards, and in each series of tests the individual mixes were on a comparable basis with respect to cement+cement replacement content and degree of workability as measured in accordance with ASTM C 143-78. The test used for compressive strength was ASTM C39, and the test for set time was ASTM C403.

Compatabilizing admixtures according to the present invention were prepared by introducing into aqueous solution, a polycarboxylate polyalkenoxide copolymer (Polymer A) of the formula:

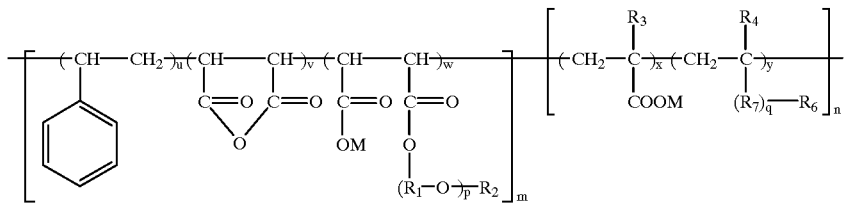

wherein $R_3$, $R_4$ and $R_6$ are methyl, $R_5$ is ethyl, $R_7$ is a polyethylene glycol moiety with q=about 75 (M.W.=1000), M is Na, m is 0, n is about 10–20, x and y are each 1 and accelerator compounds listed in Table 1 below. Components are reported in pounds delivered per 100 pounds of cementitious material (cement+cement replacement).

TABLE 1C

| Components | Admixture A | Admixture B |
|---|---|---|
| Calcium nitrate | 0.296–0.593 | 0.296–0.593 |
| Sodium Thiocyanate | 0.023–0.047 | 0.023–0.047 |
| Tetrahydroxyethylene Diamine | 0 | 0.016–0.032 |
| Triethanolamine | 0.005–0.01 | 0.005–0.01 |
| Copolymer (Polymer A) | 0.035–0.07 | 0.035–0.07 |

The admixture solutions above were utilized in the mix designs set forth in the Tables below. Cementitious mixtures resulting from the mixtures were tested for set time, compressive strength, and workability.

EXAMPLES 1–6

The cementitious material mix design prepared for examples 1–6 is set forth in Table A, below.

Admixture A was used in examples 1, 2 and 4, and admixture B was used in example 5. Control examples 3 and 6 had no fly ash replacement for the portland cement, and thus no compatabilizing admixture was used. Set times are reported in Table 2 below.

TABLE A

Mix Design information for Table 2:
Weights are in pounds per cubic yard,
weights in parenthesis are in $Kg/m^3$.

| Ex. (Mix) | Cement | Fly ash | Stone | Sand | Water |
|---|---|---|---|---|---|
| 1 and 2 | 388 (230) | Class C 169 (100) | 1791 (1063) | 1372 (814) | 211 (125) |
| 3C | 559 (332) | 0 | 1960 (1163) | 1372 (814) | 264 (157) |
| 4 and 5 | 380 (225) | Class F 160 (95) | 1896 (1125) | 1273 (755) | 265 (157) |
| 6C | 540 (320) | 0 | 1896 (1125) | 1253 (743) | 305 (181) |

TABLE 2

Fly Ash Containing Concrete Treated with Admixture vs Untreated Plain Concrete

| Example Number | Class of Fly Ash | % Replacement by weight of cement | Dose of admixture in fl. oz/100 lbs of cementitious material (ml/100 kg) | Initial Set Time (hrs:min) | 28-Day Compressive Strength PSI | MPa |
|---|---|---|---|---|---|---|
| 1 | C | 30% | 10 (650) | 5:26 | 6610 | 45.6 |
| 2 | C | 30% | 15 (978) | 4:59 | 7260 | 50.1 |
| 3C | None | N/A | N/A | 5:05 | 6930 | 47.8 |
| 4 | F | 30% | 10 (650) | 5:04 | 4150 | 28.6 |
| 5 | F | 30% | 15 (978) | 5:44 | 3910 | 27.0 |
| 6C | None | N/A | N/A | 6:30 | 4480 | 30.9 |

Set time for inventive example 2, containing 30% fly ash replacement for portland cement, was slightly faster compared to comparative example 3, while inventive examples 4 and 5 were faster than comparative example 6. The use of the inventive, compatabilizing admixture permitted a reduction in the amount of water used in the mix design, and set times were not retarded, but rather were accelerated for the inventive mixtures. Compressive strength was slightly less for example 1 than for example 3C, and slightly less for examples 4 and 5 than for example 6C. This is because the concretes being compared are plain concrete in 3C and 6C, versus concrete with cement replacement in the inventive examples. By increasing admixture dosage (and enhancing water reduction) for the inventive mixtures, compressive strength can exceed that for even plain concrete, as in example 2.

EXAMPLES 7–12

The cementitious material mix design prepared for examples 7–12 is set forth in Table B, below.

Admixture A was used in examples 8, 9 and 11, while admixture B was used in example 12. Comparative examples 7 and 10 contained 30% fly ash by weight of cement, as did the examples according to the invention, but contained no compatabilizing admixture. Results of the tests are set forth in Table 3.

TABLE B

Mix Design information for Table 3:
Weights are in pounds per cubic yard,
weights in parenthesis are in $Kg/m^3$.

| Ex. (Mix) | Cement | Fly ash | Stone | Sand | Water |
|---|---|---|---|---|---|
| 7 | 392 (233) | Class C 167 (99) | 1788 (1061) | 1366 (810) | 228 (135) |
| 8 and 9 | 388 (230) | Class C 169 (100) | 1791 (1063) | 1372 (814) | 211 (125) |

TABLE B-continued

Mix Design information for Table 3:
Weights are in pounds per cubic yard,
weights in parenthesis are in Kg/m³.

| Ex. (Mix) | Cement | Fly ash | Stone | Sand | Water |
|---|---|---|---|---|---|
| 10 | 380 (225) | Class F 160 (95) | 1896 (1125) | 1256 (745) | 285 (169) |
| 11 and 12 | 380 (225) | Class F 160 (95) | 1896 (1125) | 1273 (755) | 265 (157) |

TABLE 3

Fly Ash Containing Concrete Treated with Admixture vs Untreated Fly Ash

| Example Number | Class of Fly Ash | % Replacement by weight of cement | Dose of admixture in fl. oz/100 lbs of cementitious material (ml/100 kg) | Initial Set Time (hrs:min) | 28-Day Compressive Strength PSI | 28-Day Compressive Strength MPa |
|---|---|---|---|---|---|---|
| 7C | C | 30% | N/A | 7:24 | 7230 | 49.8 |
| 8 | C | 30% | 10 (650) | 5:26 | 6610 | 45.6 |
| 9 | C | 30% | 15 (978) | 4:59 | 7260 | 50.1 |
| 10C | F | 30% | N/A | 7:07 | 3490 | 24.1 |
| 11 | F | 30% | 10 (650) | 5:04 | 4150 | 28.6 |
| 12 | F | 30% | 15 (978) | 5:44 | 3910 | 27.0 |

The set times of the fly ash containing cementitious mixtures which did not contain the compatabilizing admixture were significantly retarded, while the set times of the inventive mixes compared favorably with the comparative examples that did not contain the retarding fly ash replacement component. Compressive strength greater than the comparative fly ash containing concrete was achieved by the use of the compatabilizing admixture, as shown in example 9 as compared to 7C, and examples 11 and 12 as compared to 10C.

EXAMPLES 13–16

The cementitious material mix design prepared for examples 13–16 is set forth in Table C, below.

Admixture B was used in examples 14 and 16. Comparative example 13 contained 25% blast furnace slag by weight of cement, as did example 14 according to the invention, but contained no compatabilizing admixture. Comparative example 15 contained 50% blast furnace slag by weight of cement, as did example 16 according to the invention, but contained no compatabilizing admixture. Results of the tests are set forth in Table 4.

TABLE C

Mix Design information for Table 4:
Weights are in pounds per cubic yard,
weights in parenthesis are in Kg/m³.

| Ex. (Mix) | Cement | Slag | Stone | Sand | Water |
|---|---|---|---|---|---|
| 13C | 413 (245) | 138 (82) | 1842 (1093) | 1381 (819) | 326 (193) |
| 14 | 416 (247) | 140 (83) | 1845 (1095) | 1387 (823) | 290 (172) |
| 15C | 269 (160) | 269 (160) | 1785 (1059) | 1357 (805) | 349 (207) |
| 16 | 281 (167) | 279 (166) | 1840 (1092) | 1396 (828) | 295 (175) |

TABLE 4

Blast Furnace Slag Containing Concrete Treated with Admixture vs Untreated Slag

| Example Number | % Replacement by weight of cement | Dose of admixture in fl. oz/100 lbs of cementitious material (ml/100 kg) | Initial Set Time (hrs:min) | 28-Day Compressive Strength PSI | 28-Day Compressive Strength MPa |
|---|---|---|---|---|---|
| 13C | 25% | N/A | 7:10 | 6165 | 42.51 |
| 14 | 25% | 14.6 (952) | 4:55 | 7343 | 50.63 |
| 15C | 50% | N/A | 7:44 | 5396 | 37.20 |
| 16 | 50% | 14.6 (952) | 6:22 | 7291 | 50.27 |

In the examples of the invention, water reduction was achieved with the use of the inventive compatabilizing admixture, while the set times of the inventive cementitious mixtures were significantly lower than their corresponding uncompatabilized comparative examples.

EXAMPLES 17–19

The cementitious material mix design prepared for examples 17–19 is set forth in Table D, below.

TABLE D

Mix Design information for Table 5
Weights are in pounds per cubic yard, weights in parenthesis are in Kg/m³

| Ex. (Mix) | Cement | Stone | Sand | Water |
|---|---|---|---|---|
| 17C | 517 (307) | 1800 (1068) | 1474 (875) | 292 (173) |
| 18 | 517 (307) | 1800 (1068) | 1480 (878) | 285 (169) |
| 19 | 517 (307) | 1800 (1068) | 1490 (884) | 269 (160) |

In the mix design for examples 17C, 18 and 19, the cement contained 24% natural pozzolanic materials. Comparative example 17 contained no compatabilizing admixture, while Admixture A was introduced into the mix for examples 18 and 19. Results of the tests are set forth in Table 5.

TABLE 5

Pozzolanic Cement Concrete Treated with Admixture vs Untreated Pozzolanic

| Example Number | Dose of admixture in fl. oz/100 lbs of cementitious material (ml/100 kg) | Initial Set Time (hrs:min) | 28-Day Compressive Strength (PSI) | 28-Day Compressive Strength (MPa) |
|---|---|---|---|---|
| 17C | N/A | 4:41 | 4500 | 31.0 |
| 18 | 10 (650) | 5:21 | 4990 | 34.4 |
| 19 | 20 (1300) | 3:55 | 5200 | 35.9 |

Water reduction was achieved by the inventive examples 18 and 19, while the set time for example 19 was significantly accelerated over the corresponding comparative example 17.

EXAMPLES 20–24

The following mix design was prepared:

| Component | lbs./cubic yard | Kg/m³ |
|---|---|---|
| Portland Cement | 420 | 249 |
| Stone | 1800 | 1068 |
| Sand | 1350 | 801 |
| Class C fly ash | 180 | 107 |

The cementitious mixture was tested for set times with the addition of no compatabilizing admixture, and with the addition of various compatabilizing polymer containing admixtures. Test results are set forth in Table 6. Polymer A used in examples 21 and 22 had the formula:

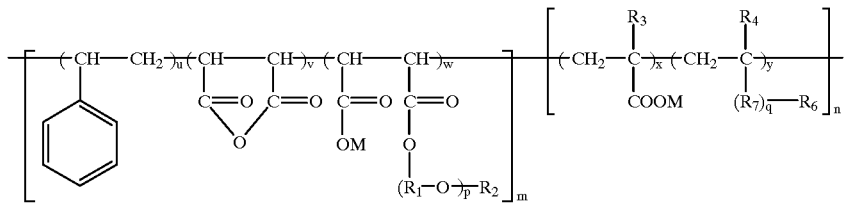

where the constituents are as defined above for polymer A. Polymer B used in example 23 had the formula:

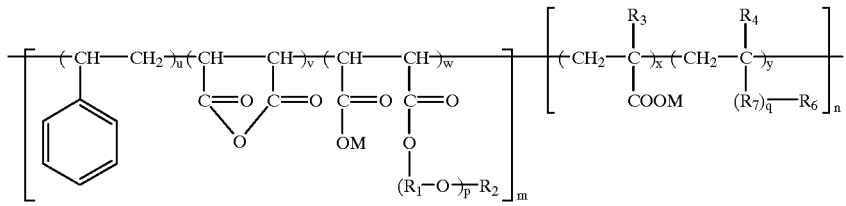

wherein $R_1$ is ethyl, with p=24 to 25, $R_2$ is methyl, M is Na, m is about 16 to about 25, n is zero, u to (v+w)=1:1, and v to w is 1:1.

TABLE 6

Results for Compatabilizing Polymer with 30% Class C fly ash

| Example | Admixture | Initial Set Time (hrs:min) |
|---|---|---|
| 20C | None | 9:06 |
| 21C | Polymer A @ 3 oz (no accelerator) | 9:20 |
| 22 | Polymer A @ 17 oz. in Admixture A | 6:19 |
| 23 | Polymer B @ 17 oz. in Admixture A | 6:24 |
| 24C | None | 7:19 |

The following further mix designs were prepared and tested at 50° F., using the polymer and accelerator Admixture A according to the present invention, or as controls, without the admixture. Components and test results are set forth in Tables 7 A (English units) and 7 B (SI units).

TABLE 7 A

| Example # | 25C | 26C | 27C | 28 | 29 | 30 | 31 |
|---|---|---|---|---|---|---|---|
| Admixture (Fl. oz/100 lbs) | — | — | — | 10 | 20 | 10 | 20 |
| Cement (lb) | 608 | 423 | 417 | 423 | 426 | 422 | 422 |
| Class C Fly Ash (lb) | — | 180 | — | 181 | 182 | — | — |
| Class F Fly Ash (lb) | — | — | 178 | — | — | 180 | 180 |
| Sand (lb) | 1329 | 1341 | 1322 | 1364 | 1376 | 1314 | 1321 |
| Stone (lb) | 1824 | 1813 | 1787 | 1815 | 1826 | 1807 | 1807 |
| Water (lb) | 319 | 292 | 315 | 276 | 259 | 303 | 293 |
| W/C + Fly Ash | .525 | .485 | .530 | .456 | .426 | .504 | .486 |
| % Water Reduction | — | — | — | 6.0 | 12.2 | 5.0 | 8.3 |
| Air % | 0.6 | 1.2 | 1.0 | 1.6 | 2.0 | 1.3 | 1.8 |
| Slump (in.) | 6.0 | 6.5 | 6.5 | 6.5 | 7.0 | 6.25 | 6.75 |
| Compressive Strength (PSI) | | | | | | | |
| 1 Day | 2090 | 1160 | 1090 | 1420 | 1920 | 1190 | 1380 |
| 7 Day | 3450 | 2690 | 1915 | 3600 | 4250 | 2400 | 2840 |
| 28 Day | 5420 | 4820 | 3420 | 5140 | 6460 | 3750 | 4570 |
| Initial Set Time | 7:48 | 12:15 | 10:21 | 9:22 | 6:54 | 7:27 | 6:10 |

TABLE 7 B

| Example # | 25C | 26C | 27C | 28 | 29 | 30 | 31 |
|---|---|---|---|---|---|---|---|
| Admixture (ml/100 kg) | — | — | — | 650 | 1300 | 650 | 1300 |
| Cement (kg/m³) | 361 | 251 | 247 | 251 | 253 | 250 | 250 |
| Class C Fly Ash (kg/m³) | — | 107 | — | 107 | 108 | — | — |
| Class F Fly Ash (kg/m³) | — | — | 106 | — | — | 107 | 107 |
| Sand (kg/m³) | 788 | 796 | 784 | 809 | 816 | 780 | 784 |
| Stone (kg/m³) | 1082 | 1077 | 1060 | 1077 | 1083 | 1072 | 1072 |
| Water (kg/m³) | 189 | 173 | 187 | 164 | 154 | 180 | 174 |

TABLE 7 B-continued

| Example # | 25C | 26C | 27C | 28 | 29 | 30 | 31 |
|---|---|---|---|---|---|---|---|
| W/C + Fly Ash | .525 | .485 | .530 | .456 | .426 | .504 | .486 |
| % Water Reduction | — | — | — | 6.0 | 12.2 | 5.0 | 8.3 |
| Air % | 0.6 | 1.2 | 1.0 | 1.6 | 2.0 | 1.3 | 1.8 |
| Slump (mm) | 150 | 165 | 165 | 165 | 180 | 160 | 170 |
| Compressive Strength (MPa) | | | | | | | |
| 1 Day | 14.4 | 8.0 | 7.5 | 9.8 | 13.2 | 8.2 | 9.5 |
| 7 Day | 23.8 | 18.5 | 13.2 | 24.8 | 29.3 | 16.5 | 19.6 |
| 28 Day | 37.4 | 33.2 | 23.6 | 35.4 | 44.5 | 25.9 | 31.5 |
| Initial Set Time | 7:48 | 12:15 | 10:21 | 9:22 | 6:54 | 7:27 | 6:10 |

As demonstrated above, the present invention achieves the objects of the invention. A cementitious mixture is provided which contains a significant proportion of pozzolan cement replacement materials for hydraulic cement, such as portland cement, as well as water reducing materials, which have acceptable or improved compressive strength, and which set in an industry-acceptable time period. A method is provided for preparing a cementitious material which contains a significant proportion of pozzolan cement replacement materials for hydraulic cement, such as portland cement, as well as water reducing materials, which have acceptable or improved compressive strength and which set in an industry-acceptable time period. The objects are achieved through the inventive compatabilizing admixture for cementitious mixtures which contain a significant proportion of pozzolan cement replacement.

The compatabilizing admixture acts as a mid-range water reducer (permitting a reduction of mix water of from about 5% to about 15%. Compressive strength and durability of the resulting product are improved. Significant replacement of hydraulic cement by pozzolanic materials is achieved, with setting times for the cementitious mixture containing the replacement, such as both Class C and Class F fly ash, equivalent to or less than set times for conventional mixtures without the replacement materials. Set times of the inventive cementitious mixtures are significantly accelerated over untreated concrete containing high amounts of fly ash, blast furnace slag or pozzolanic cement.

It should be appreciated that the present invention is not limited to the specific embodiments described above, but includes variations, modifications and equivalent embodiments defined by the following claims.

We claim:

1. A cementitious mixture comprising a hydraulic cement; greater than about 10% by weight of a pozzolanic cement replacement selected from the group consisting of fly ash, slag, natural pozzolans, and mixtures thereof based on the weight of said hydraulic cement and cement replacement; and a compatabilizing admixture, wherein the compatabilizing admixture comprises a polycarboxylate polymer dispersant, in combination with an accelerator for concrete, wherein the polycarboxylate polymer dispersant comprises a polycarboxylate backbone polymer containing polyoxyalkylene group side chains.

2. The cementitious mixture of claim 1 wherein the hydraulic cement is portland cement.

3. The cementitious mixture of claim 1 containing at least 50% portland cement based on the weight of said hydraulic cement and cement replacement.

4. The cementitious mixture of claim 1 further including at least one of silica fume and metakaolin.

5. The cementitious mixture of claim 1 including greater than about 15% of the cement replacement by weight of hydraulic cement and cement replacement.

6. The cementitious mixture of claim 1 wherein the cement replacement comprises fly ash in the amount of at least about 15% by weight of hydraulic cement and cement replacement.

7. The cementitious mixture of claim 6 wherein the cement replacement comprises Class C fly ash.

8. The cementitious mixture of claim 6 wherein the cement replacement comprises Class F fly ash.

9. The cementitious mixture of claim 1 wherein the cement replacement comprises slag in the amount of at least about 25% by weight of hydraulic cement and cement replacement.

10. The cementitious mixture of claim 1 wherein the cement replacement comprises natural pozzolan in the amount of at least about 24% by weight of hydraulic cement and cement replacement.

11. The cementitious mixture of claim 1 further including aggregate.

12. The cementitious mixture of claim 1 wherein the compatabilizing admixture is chloride free.

13. The cementitious mixture of claim 1 wherein the accelerator comprises at least one of
    a) a nitrate salt of an alkali metal, alkaline earth metal, or aluminum;
    b) a nitrite salt of an alkali metal, alkaline earth metal, or aluminum;
    c) a thiocyanate of an alkali metal, alkaline earth metal, or aluminum;
    d) an alkanolamine;
    e) a thiosulphate of an alkali metal, alkaline earth metal, or aluminum;
    f) a hydroxide of an alkali metal, alkaline earth metal, or aluminum;
    g) a carboxylic acid salt of an alkali metal, alkaline earth metal, or aluminum; or,
    h) a polyhydroxylalkylamine.

14. The cementitious mixture of claim 13 wherein the accelerator comprises an aqueous solution of
    a) 0 to about 60% of said nitrate salt;
    b) 0 to about 60% of said nitrite salt;
    c) 0 to about 10% of said thiocyanate;
    d) 0 to about 10% of said alkanolamine;
    e) 0 to about 10% of said thiosulphate;
    f) 0 to about 10% of said hydroxide;
    g) 0 to about 20% of said carboxylic acid salt;
    h) 0 to about 5% of said polyhydroxylalkylamine;
wherein at least one of components a through h is present, and the remaining percentage of the solution comprises about 1 to about 20% of said polycarboxylate dispersant and water.

15. The cementitious mixture of claim 13 wherein the compatabilizing admixture contains an alkali metal compound, wherein the metal is Na or K, and the anion is selected from the group consisting of a, b, c, e, f, g, and mixtures thereof.

16. The cementitious mixture of claim 13 wherein the compatabilizing admixture contains an alkaline earth metal compound, wherein the metal is Ca or Mg, and the anion is selected from the group consisting of a, b, c, e, f, g, and mixtures thereof.

17. The cementitious mixture of claim 13 wherein the compatabilizing admixture contains an aluminum metal compound, wherein the anion is selected from the group consisting of a, b, c, e, g, and mixtures thereof.

18. The cementitious mixture of claim 1 wherein the compatabilizing admixture contains
   a) a nitrate salt of an alkali metal, alkaline earth metal, or aluminum;
   b) a thiocyanate of an alkali metal, alkaline earth metal, or aluminum; and,
   c) optionally an alkanolamine; and,
   d) optionally, a polyhydroxylalkylamine.

19. The cementitious mixture of claim 18 wherein the compatabilizing admixture comprises an aqueous solution of
   a) about 20 to about 40% of said nitrate salt;
   b) about 1 to about 4% of said thiocyanate;
   c) 0 to about 1% of said alkanolamine; and,
   d) 0 to about 4% of said polyhydroxylalkylamine;
and the remaining percentage of the solution comprises about 3 to about 8% of said polycarboxylate dispersant and water.

20. The cementitious mixture of claim 1 wherein the compatabilizing admixture contains calcium nitrate, sodium thiocyanate, triethanolamine and tetrahydroxyethylene diamine.

21. The cementitious mixture of claim 1 wherein the compatabilizing admixture contains calcium nitrate, sodium thiocyanate, and triethanolamine.

22. The cementitious mixture of claim 1 wherein the active components of the compatabilizing admixture is present in an amount of about 0.09 to about 2 parts per 100 parts by weight of hydraulic cement and cement replacement.

23. The cementitious mixture of claim 1 wherein the polycarboxylate polymer dispersant comprises a polyvinyl carboxylate polymer, derivatized with at least one of carboxyl, sulfonate, and phosphonate functional moieties.

24. The cementitious mixture of claim 1 wherein said polyoxyalkylene side chains comprise at least one of i) ethylene oxide units, and ii) propylene oxide units.

25. The cementitious mixture of claim 1 wherein the polycarboxylate polymer dispersant comprises a polymer of the general formula I:

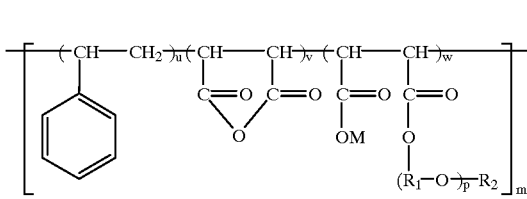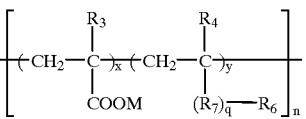

wherein
   $R_1$ and $R_5$ are each independently $C_2$–$C_3$ alkyl,
   $R_2$, $R_3$, $R_4$, and $R_6$ are each independently H, or $C_1$–$C_5$ alkyl,
   and $R_7$ is one of $O(R_5O)$, $CH_2O(R_5O)$, $COO(R_5O)$, and $CONH(R_5O)$;
   M is at least one of H, Li, Na, K, Ca, Mg, $NH_4$, alkylamine and hydroxyalkylamine;
   n+m=3 to about 100,
   when m=0, n=about 5 to about 100,
   when n=0, m=about 3 to about 100,
   p and q are each independently 1 to about 100,
   u, v, and w, are each independently 1 to about 100,
   with the proviso that when both n>0 and m>0, one of u, v or w may be zero,
      when present, the ratio of u to (v+w) is from about 1:10 to about 10:1,
      the ratio of u to v is from about 1:1 to about 100:1,
      m+p=about 10 to about 400;
   x, and y are each independently 1 to about 100,
   the proviso that when both n>0 and m>0, one of x or y may be zero,
      when both are present, the ratio of x to y is about 1:10 to about 10:1,
      n+q=about 10 to about 400,
and corresponding acid and alkali metal, alkaline earth metal, or ammonium salt derivatives of the anhydride group "v".

26. The cementitious mixture of claim 25 wherein one of m and n are zero.

27. The cementitious mixture of claim 25 wherein the polycarboxylate polymer polymer includes styrene as monomer (u); at least one of maleic anhydride, maleic acid and salts thereof as monomer (v); polyalkylene glycol as monomer (w); at least one of acrylic acid, methacrylic acid and salts thereof as monomer (x); and, as monomer (y), at least one of polyethylene glycol mono(meth)acrylate, polypropylene glycol mono(meth)acrylate, polyethylene glycol polypropylene glycol mono(meth)acrylate, methoxy polyethylene glycol mono(meth)acrylate, methoxy polypropylene glycol mono(meth)acrylate, methoxy polyethylene glycol polypropylene glycol mono(meth)acrylate, ethoxy polyethylene glycol mono(meth)acrylate, ethoxy polypropylene glycol mono(meth)acrylate, ethoxy polyethylene glycol polypropylene glycol mono(meth)acrylate, and mixtures thereof.

28. The cementitious mixture of claim 25 wherein the polycarboxylate polymer dispersant comprises a polymer of the general formula IV:

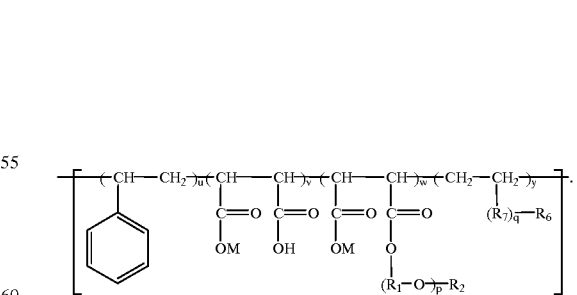

29. The cementitious mixture of claim 28 wherein ($R_1$—O)$_p$—$R_2$ is a polyalkylene glycol chain, $R_5$ is $CH_2CH_2$, $R_6$ is $CH_3$, and $R_7$ is $CH_2O(R_5O)$.

30. The cementitious mixture of claim 1 wherein the polycarboxylate polymer dispersant comprises a polymer of the general formula V:

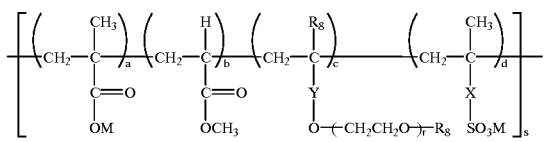

wherein $R_8$ is H or $CH_3$, X is $CH_2$ or $CH_2$-ø, and Y is $CH_2$ or C=O,

M is at least one of H, Li, Na, K, Ca, Mg, $NH_4$, alkylamine and hydroxyalkylamine;

a+b+c+d=1, r is about 10 to about 1000, and s=2 to about 500.

31. The cementitious mixture of claim 1 wherein the polycarboxylate polymer dispersant comprises a polymer of the general formula VI:

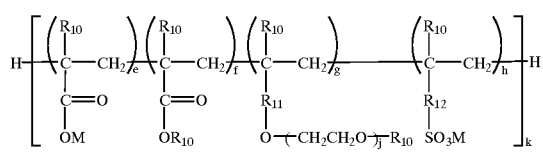

wherein $R_{10}$ is H or $CH_3$, $R_{11}$ is $CH_2$ or C=O, $R_{12}$ is $CH_2$ or $CH_2$-Ø, M is at least one of Hi, Li, Na, K, Ca, Mg, $NH_4$, alkylamine and hydroxyalkylamine;

e+f+g+h=1, j is about 10 to about 1000, k=2 to about 500.

32. The cementitious mixture of claim 1 wherein the polycarboxylate polymer dispersant comprises a polymer of the general formula VII:

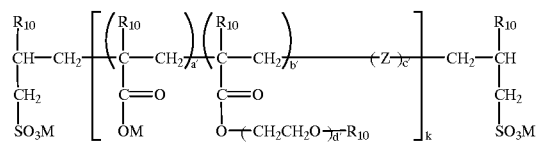

wherein

Z is a monomer capable of copolymerizing with the monomers of groups a' and b', $R_{10}$ is H or $CH_3$, M is at least one of H, Li, Na, K, Ca, Mg, $NH_4$, alkylamine and hydroxyalkylamine;

a'+b'+c'=1, d' is about 10 to about 10,000, and k=2 to about 500.

33. The cementitious mixture of claim 1 wherein the polycarboxylate polymer dispersant comprises a polymer of the general formula VIII:

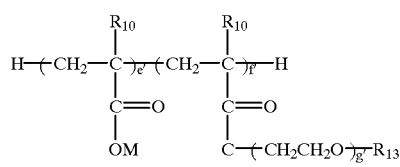

wherein $R_{10}$ is H or $CH_3$, $R_{13}$ is $CH_3$,

M is at least one of H, Li, Na, K, Ca, Mg, $NH_4$, alkylamine and hydroxyalkylamine;

e':f' is about 2:1 to about 100:1, and g' is about 10 to about 1000.

34. The cementitious mixture of claim 1 wherein the polycarboxylate polymer dispersant comprises a polymer of the general formula IX:

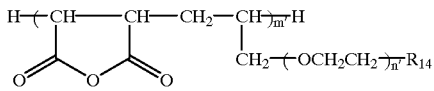

wherein $R_{14}$ is $CH_3$ or t-butylene, m'=1 to about 100, and n'=about 10 to about 1000.

35. A compatabilizing admixture for cementitious mixtures containing hydraulic portland cement and greater than about 10 percent pozzolanic cement replacement by weight of the portland cement and cement replacement, comprising a polycarboxylate polymer dispersant, in combination with an accelerator for concrete, wherein the polycarboxylate polymer dispersant comprises a polycarboxylate backbone polymer containing polyoxyalkylene group side chains.

36. The admixture of claim 35 wherein the compatabilizing admixture is chloride free.

37. The admixture of claim 35 wherein the accelerator comprises at least one of a) a nitrate salt of an alkali metal, alkaline earth metal, or aluminum;

b) a nitrite salt of an alkali metal, alkaline earth metal, or aluminum;

c) a thiocyanate of an alkali metal, alkaline earth metal, or aluminum;

d) an alkanolamine;

e) a thiosulphate of an alkali metal, alkaline earth metal, or aluminum;

f) a hydroxide of an alkali metal, alkaline earth metal, or aluminum;

g) a carboxylic acid salt of an alkali metal, alkaline earth metal, or aluminum; or, h) a polyhydroxylalkylamine.

38. The admixture of claim 37 wherein the accelerator comprises an aqueous solution of a) 0 to about 60% of said nitrate salt;

b) 0 to about 60% of said nitrite salt;

c) 0 to about 10% of said thiocyanate;

d) 0 to about 10% of said alkanolamine;

e) 0 to about 10% of said thiosulphate;

f) 0 to about 10% of said hydroxide;

g) 0 to about 20% of said carboxylic acid salt;

h) 0 to about 5% of said polyhydroxylalkylamine;

wherein at least one of components a through h is present, and the remaining percentage of the solution comprises about 1 to about 20% of said polymer and water.

39. The admixture of claim 35 wherein the compatabilizing admixture contains a) a nitrate salt of an alkali metal, alkaline earth metal, or aluminum;

b) a thiocyanate of an alkali metal, alkaline earth metal, or aluminum; and, c) optionally an alkanolamine; and, d) optionally, a polyhydroxylalkylamine.

40. The admixture of claim 39 wherein the compatabilizing admixture comprises an aqueous solution of a) about 20 to about 40% of said nitrate salt;

b) about 1 to about 4% of said thiocyanate;

c) 0 to about 1% of said alkanolamine; and, d) 0 to about 4% of said polyhydroxylalkylamine; and the remaining percentage of the solution comprises about 3 to about 8% of said polycarboxylate dispersant and water.

41. The admixture of claim 35 wherein the compatabilizing admixture contains calcium nitrate, sodium thiocyanate, triethanolamine and tetrahydroxyethylene diamine.

42. The admixture of claim 35 wherein the compatabilizing admixture contains calcium nitrate, sodium thiocyanate, and triethanolamine.

43. The admixture of claim 35 wherein the polycarboxylate polymer dispersant comprises a polyvinyl carboxylate polymer, derivatized with at least one of carboxyl, sulfonate, and phosphonate functional moeities.

44. The admixture of claim 35 wherein said polyoxyalkylene side chains comprise at least one of i) hydrophilic ethylene oxide units, and ii) hydrophobic propylene oxide units.

45. The admixture of claim 35 wherein the polycarboxylate polymer dispersant comprises a polymer of the general formula I:

46. The admixture of claim 45 wherein one of m and n are zero.

47. The admixture of claim 45 wherein the polycarboxylate polymer polymer includes styrene as monomer (u); at least one of maleic anhydride, maleic acid and salts thereof as monomer (v); polyalkylene glycol as monomer (w); at least one of acrylic acid, methacrylic acid and salts thereof as monomer (x); and, as monomer (y), at least one of polyethylene glycol mono(meth)acrylate, polypropylene glycol mono(meth)acrylate, polyethylene glycol polypropylene glycol mono(meth)acrylate, methoxy polyethylene glycol mono(meth)acrylate, methoxy polypropylene glycol mono(meth)acrylate, methoxy polyethylene glycol polypropylene glycol mono(meth)acrylate, ethoxy polyethylene glycol mono(meth)acrylate, ethoxy polypropylene glycol mono(meth)acrylate, ethoxy polyethylene glycol polypropylene glycol mono(meth)acrylate, and mixtures thereof.

48. The admixture of claim 45 wherein the polycarboxylate polymer dispersant comprises a polymer of the general formula IV:

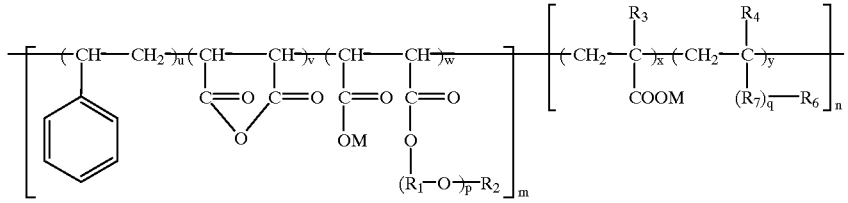

wherein $R_1$ and $R_5$ are each independently $C_2$–$C_3$ alkyl, $R_2$, $R_3$, $R_4$, and $R_6$ are each independently H, or $C_1$–$C_5$ alkyl, and $R_7$ is one of $O(R_5O)$, $CH_2O(R_5O)$, $COO(R_5O)$, and $CONH(R_5O)$;

M is at least one of H, Li, Na, K, Ca, Mg, $NH_4$, alkylamine and hydroxyalkylamine;

n+m=3 to about 100, when m=0, n=about 5 to about 100, when n=0, m=about 3 to about 100, p and q are each independently 1 to about 100, u, v, and w, are each independently 1 to about 100, with the proviso that when both n>0 and m>0, one of u, v or w may be zero, when present, the ratio of u to (v+w) is from about 1:10 to about 10:1, the ratio of u to v is from about 1:1 to about 100:1, m+p=about 10 to about 400;

x, and y are each independently 1 to about 100, the proviso that when both n>0 and m>0, one of x or y may be zero, when both are present, the ratio of x to y is about 1:10 to about 10:1, n+q=about 10 to about 400, and corresponding acid and alkali metal, alkaline earth metal, or ammonium salt derivatives of the anhydride group "v".

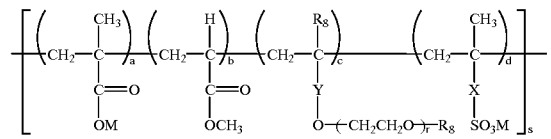

49. The admixture of claim 48 wherein $(R_1$—$O)_p$—$R_2$ is a polyalkylene glycol chain, $R_5$ is $CH_2CH_2$, $R_6$ is $CH_3$, and $R_7$ is $CH_2O(R_5O)$.

50. The admixture of claim 35 wherein the polycarboxylate polymer dispersant comprises a polymer of the general formula V:

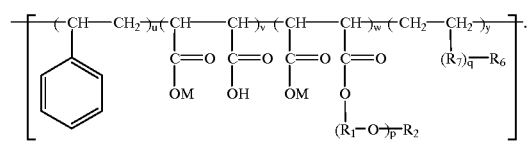

wherein $R_8$ is H or $CH_3$, X is $CH_2$ or $CH_2$-$\varnothing$, and Y is $CH_2$ or C=O, M is at least one of H, Li, Na, K, Ca, Mg, $NH_4$, alkylamine and hydroxyalkylamine;

a+b+c+d=1, r is about 10 to about 1000, and s=2 to about 500.

51. The admixture of claim 35 wherein the polycarboxylate polymer dispersant comprises a polymer of the general formula VI:

$$H\left[\left(\begin{array}{c}R_{10}\\C-CH_2\\C=O\\OM\end{array}\right)_e\left(\begin{array}{c}R_{10}\\C-CH_2\\C=O\\OR_{10}\end{array}\right)_f\left(\begin{array}{c}R_{10}\\C-CH_2\\R_{11}\\O-(CH_2CH_2O)_j-R_{10}\end{array}\right)_g\left(\begin{array}{c}R_{10}\\C-CH_2\\R_{12}\\SO_3M\end{array}\right)_h\right]_k H$$

wherein $R_{10}$ is H or $CH_3$, $R_{11}$ is $CH_2$ or $C=O$, $R_{12}$ is $CH_2$ or $CH_2$-Ø, M is at least one of H, Li, Na, K, Ca, Mg, $NH_4$, alkylamine and hydroxyalkylamine;

e+f+g+h=1, j is about 10 to about 1000, k=2 to about 500.

52. The admixture of claim 35 wherein the polycarboxylate polymer dispersant comprises a polymer of the general formula VII:

$$\begin{array}{c}R_{10}\\CH-CH_2\\CH_2\\SO_3M\end{array}\left[\left(\begin{array}{c}R_{10}\\C-CH_2\\C=O\\OM\end{array}\right)_{a'}\left(\begin{array}{c}R_{10}\\C-CH_2\\C=O\\O-(CH_2CH_2O)_{d'}-R_{10}\end{array}\right)_{b'}(Z)_{c'}\right]_k\begin{array}{c}R_{10}\\CH_2-CH\\CH_2\\SO_3M\end{array}$$

wherein

Z is a monomer capable of copolymerizing with the monomers of groups a' and b', $R_{10}$ is H or $CH_3$, M is at least one of H, Li, Na, K, Ca, Mg, $NH_4$, alkylamine and hydroxyalkylamine;

a'+b'+c'=1, d' is about 10 to about 10,000, and k=2 to about 500.

53. The admixture of claim 35 wherein the polycarboxylate polymer dispersant comprises a polymer of the general formula VIII:

$$H-(CH_2-\underset{\underset{OM}{C=O}}{\overset{R_{10}}{C}})_{e'}(CH_2-\underset{\underset{C-(CH_2CH_2O)_{g'}-R_{13}}{C=O}}{\overset{R_{10}}{C}})_{f'}-H$$

wherein $R_{10}$ is H or $CH_3$, $R_{13}$ is $CH_3$,

M is at least one of H, Li, Na, K, Ca, Mg, $NH_4$, alkylamine and hydroxyalkylamine;

e':f' is about 2:1 to about 100:1, and g' is about 10 to about 1000.

54. The admixture of claim 35 wherein the polycarboxylate polymer dispersant comprises a polymer of the general formula IX:

$$H-(CH-CH-CH_2-CH)_{m'}-H$$
with anhydride ring O=C-O-C=O and $CH_2-(OCH_2CH_2)_{n'}-R_{14}$ wherein $R_{14}$ is $CH_3$ or t-butylene, m'=1 to about 100, and n'=about 10 to about 1000.

55. A method for preparing a cementitious material comprising mixing a hydraulic cement with a pozzolanic cement replacement selected from fly ash, slag, natural pozzolans, and mixtures thereof, and a compatibilizing admixture, wherein the compatabilizing admixture comprises a polycarboxylate polymer dispersant, in combination with an accelerator for concrete, wherein the polycarboxylate polymer dispersant comprises a polycarboxylate backbone polymer containing polyoxyalkylene group side chains.

56. The method of claim 55 wherein the polycarboxylate polymer dispersant comprises a polyvinyl carboxylate polymer, derivatized with at least one of carboxyl, sulfonate, and phosphonate functional moeities.

57. The method of claim 55 wherein said polyoxyalkylene side chains comprise at least one of i) hydrophilic ethylene oxide units, and ii) hydrophobic propylene oxide units.

58. The method of claim 55 including additionally mixing aggregate with the cement and cement replacement.

59. The method of claim 55 including additionally mixing water in an amount sufficient to effect hydraulic setting of the cement, cement replacement and aggregate mixture.

60. The method of claim 55 including additionally mixing at least one of silica fume and metakaolin with the cement and cement replacement.

61. The method of claim 55 wherein the accelerator comprises at least one of a) a nitrate salt of an alkali metal, alkaline earth metal, or aluminum;

b) a nitrite salt of an alkali metal, alkaline earth metal, or aluminum;

c) a thiocyanate of an alkali metal, alkaline earth metal, or aluminum;

d) an alkanolamine;

e) a thiosulphate of an alkali metal, alkaline earth metal, or aluminum;

f) a hydroxide of an alkali metal, alkaline earth metal, or aluminum;

g) a carboxylic acid salt of an alkali metal, alkaline earth metal, or aluminum; or, h) a polyhydroxylalkylamine.

62. The method of claim 55 wherein the polycarboxylate polymer dispersant comprises a polymer of the general formula I:

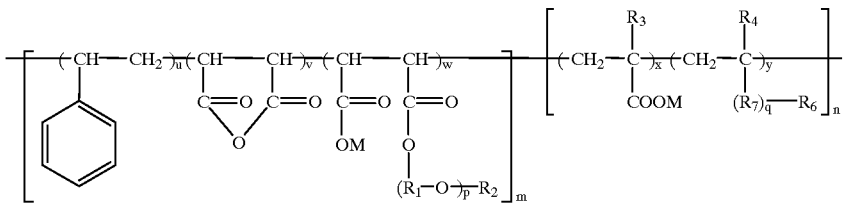

wherein $R_1$ and $R_5$ are each independently $C_2$–$C_3$ alkyl, $R_2$, $R_3$, $R_4$, and $R_6$ are each independently H, or $C_1$–$C_5$ alkyl, and $R_7$ is one of $O(R_5O)$, $CH_2O(R_5O)$, $COO(R_5O)$, and $CONH(R_5O)$;

M is at least one of H, Li, Na, K, Ca, Mg, $NH_4$, alkylamine and hydroxyalkylamine;

n+m=3 to about 100, when m=0, n=about 5 to about 100, when n=0, m=about 3 to about 100, p and q are each independently 1 to about 100, u, v, and w, are each independently 1 to about 100, with the proviso that when both n>0 and m>0, one of u, v or w may be zero, when present, the ratio of u to (v+w) is from about 1:10 to about 10:1, the ratio of u to v is from about 1:1 to about 100:1, m+p=about 10 to about 400;

x, and y are each independently 1 to about 100, the proviso that when both n>0 and m>0, one of x or y may be zero, when both are present, the ratio of x to y is about 1:10 to about 10:1, n+q=about 10 to about 400, and corresponding acid and alkali metal, alkaline earth metal, or ammonium salt derivatives of the anhydride group "v".

63. The method of claim 62 wherein the polycarboxylate polymer polymer includes styrene as monomer (u); at least one of maleic anhydride, maleic acid and salts thereof as monomer (v); polyalkylene glycol as monomer (w); at least one of acrylic acid, methacrylic acid and salts thereof as monomer (x); and, as monomer (y), at least one of polyethylene glycol mono(meth)acrylate, polypropylene glycol mono(meth)acrylate, polyethylene glycol polypropylene glycol mono(meth)acrylate, methoxy polyethylene glycol mono(meth)acrylate, methoxy polypropylene glycol mono (meth)acrylate, methoxy polyethylene glycol polypropylene glycol mono(meth)acrylate, ethoxy polyethylene glycol mono(meth)acrylate, ethoxy polypropylene glycol mono (meth)acrylate, ethoxy polyethylene glycol polypropylene glycol mono(meth)acrylate, and mixtures thereof.

64. The method of claim 62 wherein the polycarboxylate polymer dispersant comprises a polymer of the general formula IV:

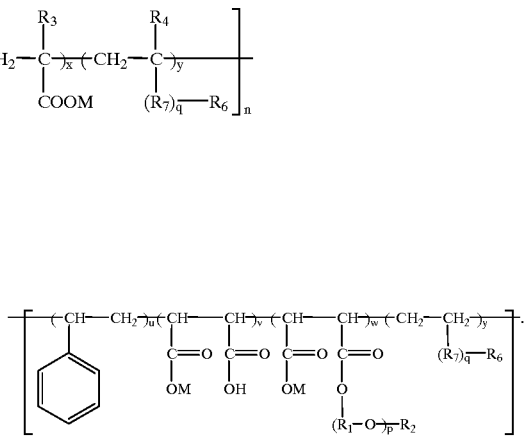

65. The method of claim 64 wherein $(R_1-O)_p-R_2$ is a polyalkylene glycol chain, $R_5$ is $CH_2CH_2$, $R_6$ is $CH_3$, and $R_7$ is $CH_2O(R_5O)$.

66. The method of claim 55 wherein the polycarboxylate polymer dispersant comprises a polymer of the general formula V:

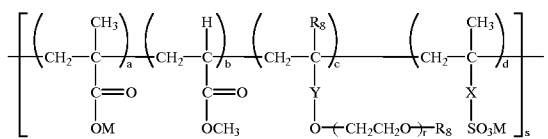

wherein $R_8$ is H or $CH_3$, X is $CH_2$ or $CH_2$-ø, and Y is $CH_2$ or C=O,

M is at least one of H, Li, Na, K, Ca, Mg, $NH_4$, alkylamine and hydroxyalkylamine a+b+c+d=1, r is about 10 to about 1000, and s=2 to about 500.

67. The method of claim 55 wherein the polycarboxylate polymer dispersant comprises a polymer of the general formula VI:

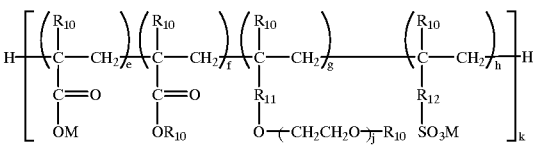

wherein $R_{10}$ is H or $CH_3$, $R_{11}$ is $CH_2$ or C=O, $R_{12}$ is $CH_2$ or $CH_2$-ø, M is at least one of H, Li, Na, K, Ca, Mg, $NH_4$, alkylamine and hydroxyalkylamine;

e+f+g+h=1, j is about 10 to about 1000, k=2 to about 500.

68. The method of claim 55 wherein the polycarboxylate polymer dispersant comprises a polymer of the general formula VII:

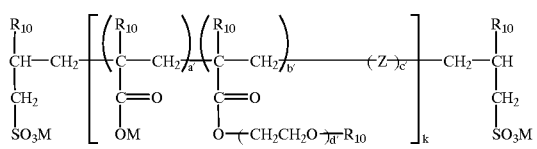

wherein

Z is a monomer capable of copolymerizing with the monomers of groups a' and b', $R_{10}$ is H or $CH_3$, M is at least one of H, Li, Na, K, Ca, Mg, $NH_4$, alkylamine and hydroxyalkylamine;

a'+b'+c'=1, d' is about 10 to about 10,000, and k=2 to about 500.

69. The method of claim 55 wherein the polycarboxylate polymer dispersant comprises a polymer of the general formula VIII:

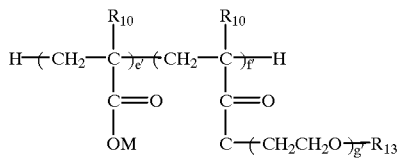

wherein $R_{10}$ is H or $CH_3$, $R_{13}$ is $CH_3$,

M is at least one of H, Li, Na, K, Ca, Mg, $NH_4$, alkylamine and hydroxyalkylamine;

e':f' is about 2:1 to about 100:1, and g' is about 10 to about 1000.

70. The method of claim 55 wherein the polycarboxylate polymer dispersant comprises a polymer of the general formula IX:

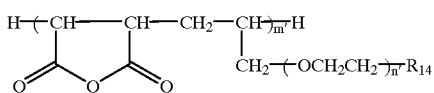

wherein $R_{14}$ is $CH_3$ or t-butylene, m'=1 to about 100, and n'=about 10 to about 1000.

* * * * *